UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF RECOVERING GLYCERIN FROM GLYCERIN FOOTS.

SPECIFICATION forming part of Letters Patent No. 522,133, dated June 26, 1894.

Application filed November 17, 1893. Serial No. 491,244. (No specimens.)

*To all whom it may concern:*

Be it known that I, JOSEPH VAN RUYMBEKE, a subject of the King of Belgium, residing at Chicago, Cook county, in the State of Illinois, have invented certain new and useful Improvements in Processes of Extracting Glycerin from Glycerin Foots; and I do hereby declare the following to be a full, clear, and exact description of the invention, which will enable others skilled in the art to which it appertains to make and use the same.

My invention relates to a new process of extracting glycerin from the residues obtained in the distillation of glycerin, and sometimes called foots and more specifically glycerin foots. In the distillation of crude glycerin, the common salt and sulfate of soda, with some other impurities are readily separated, but there are some organic salts of sodium which do not precipitate, and which yield, after the distillation of the glycerin, a mass sometimes called glycerin foots, which contains a large percentage of glycerin (thirty-three per cent. and over) but which cannot be distilled off in the ordinary way. By my process I treat these glycerin foots in such a manner that the glycerin therein may be distilled off. I find that these glycerin foots contain, in addition to the glycerin, generally about five per cent. of salt, from twenty to thirty per cent. of acetate of sodium, and from ten to fifteen per cent. of sodium salts of non-volatile organic acids, together with some minor impurities. The basis upon which my invention rests, is the fact that compounds of soda and a mineral acid, such as sodium sulfate or chlorid, are much more readily separated from soap lye, chemically purified and boiled down to salting point, than the organic sodium salts which may be decomposed by these mineral acids. Therefore, in treating the glycerin foots, I first convert the sodium compounds therein into salts of inorganic acids, such as sulfuric or muriatic acid. The precipitate formed is then separated. I then volatilize the acetic acid set free, obtaining a practically clear liquor containing a large percentage of glycerin, and capable of being easily distilled.

In carrying out my process in detail, I proceed as follows: I first find the percentage of sodium carbonate which the glycerin foots will yield by combustion, which can be determined by incinerating a small portion of the glycerin foots, and having ascertained this, I then calculate the amount of sulfuric or muriatic acid which will be necessary to neutralize the sodium salt in the glycerin foots. I then mix the proper amount of sulfuric or muriatic acid thus ascertained, with soap lye, chemically purified and boiled down to salting point, the amount of lye used being about equal to the glycerin foots to be treated. This acidulated lye, is then mixed with the glycerin foots, and the sodium compounds therein are immediately converted into sodium sulfate or chlorid, and these salts are precipitated. In practice, I find that most of the non-volatile acids are also precipitated and carried down with the sulfate or chlorid. The precipitated sodium sulfate or chlorid, and the non-volatile organic acids may then be removed from the solution by settling or filtering. The insoluble acids readily separate from the sulfate or chlorid when the latter is redissolved for the purpose of purifying. The solution being removed from the precipitate, is now heated to drive off the water and the volatile acids therein, consisting almost entirely of acetic acid, which latter generally corresponds to about two-thirds of the sulfuric acid used. This acetic acid can be collected in any suitable way, or may be passed over limestone to produce calcium acetate. After this evaporation, a clear liquid will be obtained, containing a large amount of glycerin, about eighty per cent., which may be distilled off in any suitable way. I find in practice that it is not convenient to continue the distillation of the glycerin beyond the point where the glycerin foots contain from fifty to sixty per cent. of glycerin, because at this concentration the glycerin foots are sufficiently fluid to be readily removed from the still, whereas if the concentration is carried further, the mass becomes too viscid, and if the distillation be carried to the point where the glycerin foots contain only thirty per cent. of glycerin the mass becomes quite solid when cold. Besides in this last concentration, the glycerin distills off very slowly, causing loss of heat. It is not necessary to distill the purified glycerin foots separately, but the latter may be added to the stock of crude glycerin concentrated to salting point, it being practically identical in constitution with such crude glycerin.

It is to be understood that in place of using a single mineral acid as above described, a sufficient quantity of a mixture of mineral acids may be used without departing from the spirit of my invention. It is not necessary to add the mineral acid or acids to the spent soap lye and then to add the acidified lye to the glycerin foots, yet such a mode of procedure is convenient as thereby a workable fluidity is imparted to the glycerin foots, the lye added being less viscid than the glycerin foots treated.

What I claim is—

1. In the art of recovering glycerin from glycerin foots the improvement which consists in adding to the glycerin foots a mineral acid in sufficient quantity to liberate the organic acids and subsequently volatilizing the volatile organic acid set free, as and for the purpose described.

2. In the art of recovering glycerin from glycerin foots the improvement which consists in adding to the glycerin foots a mineral acid in sufficient quantity to liberate the organic acids, separating the precipitate formed, and then volatilizing the volatile organic acids as and for the purpose described.

3. In the art of recovering glycerin from glycerin foots the improvement which consists in adding to the glycerin foots a mineral acid in sufficient quantity to liberate the organic acids contained therein, said mineral acid being dissolved in purified spent soap lye, separating the precipitate formed, volatilizing the organic acids, and then distilling the purified glycerin foots as and for the purpose described.

4. In the art of recovering glycerin from glycerin foots the improvement which consists in adding to the glycerin foots sulfuric acid in sufficient quantity to liberate the organic acids and subsequently volatilizing the volatile organic acid set free, as and for the purpose described.

5. In the art of recovering glycerin from glycerin foots the improvement which consists in adding to the glycerin foots sulfuric acid, in sufficient quantity to liberate the organic acids, separating the precipitate formed and then volatilizing the volatile organic acids as and for the purpose described.

6. In the art of recovering glycerin from glycerin foots the improvement which consists in adding to the glycerin foots sulfuric acid in sufficient quantity to liberate the organic acids contained therein, said sulfuric acid being dissolved in purified spent soap lye, separating the precipitate formed, volatilizing the organic acids and then distilling the purified glycerin foots as and for the purpose described.

7. In the art of recovering glycerin from glycerin foots the improvement which consists in adding to the material treated a mineral acid in sufficient quantity to set free the organic acids therein contained, separating the precipitate formed, distilling off and collecting the volatile acids set free, and then distilling the purified glycerin foots as and for the purpose described.

This specification signed and witnessed the 6th day of November, 1893.

JOSEPH VAN RUYMBEKE.

Witnesses:
ISAAC L. GOFF,
EDGAR A. PERKINS.